(12) United States Patent
Naito

(10) Patent No.: US 6,309,113 B1
(45) Date of Patent: Oct. 30, 2001

(54) OPTICAL MODULE, OPTICAL FIBER CONNECTING PLUG, AND OPTICAL COUPLER EQUIPPED WITH THE SAME

(75) Inventor: Katsuyoshi Naito, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/285,230

(22) Filed: Apr. 1, 1999

(30) Foreign Application Priority Data

Apr. 2, 1998 (JP) .................................................. 10-089761
Jan. 14, 1999 (JP) .................................................. 11-008117

(51) Int. Cl.⁷ ................................. G02B 6/36; G02B 6/42
(52) U.S. Cl. .................................. 385/88; 385/83; 385/92
(58) Field of Search .................................. 385/88–92, 94, 385/31, 43, 52, 83, 65, 49

(56) References Cited

U.S. PATENT DOCUMENTS

| | | | | |
|---|---|---|---|---|
| 4,029,390 | * | 6/1977 | Chinnock et al. | 385/88 |
| 4,165,914 | * | 8/1979 | Willarruel et al. | 385/52 |
| 4,218,113 | * | 8/1980 | Uberbacher | 385/72 |
| 4,306,766 | * | 12/1981 | Karol | 385/65 |
| 4,756,591 | * | 7/1988 | Fischer et al. | 385/88 |
| 4,921,324 | * | 5/1990 | Anderton | 385/55 |
| 5,179,609 | * | 1/1993 | Blonder et al. | 385/89 |
| 5,613,024 | * | 3/1997 | Shahid | 385/88 |
| 5,859,942 | * | 1/1999 | Ueda | 385/49 |

* cited by examiner

*Primary Examiner*—Jon Henry
(74) *Attorney, Agent, or Firm*—Wenderoth, Lind & Ponack, L.L.P.

(57) ABSTRACT

The present invention provides an optical module, a plug for connecting an optical fiber, or an optical coupler provided with a configuration that permits the connection of an optical fiber without using a ferrule. For this purpose, the optical module, the plug for connecting an optical fiber, or an optical coupler equipped with the same is provided with: a substrate (14); an optical device (16) mounted on the substrate; a connecting optical fiber (18), one end of which is positioned with respect to the optical device, and the distal end of a transmitting optical fiber to be connected is positioned with respect to the other end thereof; and a guide (26) for guiding the distal end of the transmitting optical fiber to be connected. The distal end of the transmitting optical fiber is positioned with respect to the first end of a connecting optical fiber by disposing the distal end of the transmitting optical fiber in the guide.

11 Claims, 7 Drawing Sheets

OPTICAL MODULE, OPTICAL FIBER CONNECTING PLUG, AND OPTICAL COUPLER EQUIPPED WITH THE SAME

FIELD OF THE INVENTION

The present invention relates to an optical module, an optical fiber connecting plug, and an optical coupler provided with the foregoing components. More particularly, this invention relates to an optical module, an optical fiber connecting plug, and an optical coupler provided with the foregoing components used for transmission in optical communication or the like.

BACKGROUND OF THE INVENTION

To perform optical communication or the like, an optical module equipped with a light emitting device or a light detecting device serving as an optical device is connected to a transmitting optical fiber for transmitting optical signals. The distal end of the transmitting optical fiber must be accurately positioned in relation to the optical device. For this purpose, a plug for connecting the transmitting optical fiber to the optical module is attached to the distal end portion of the transmitting optical fiber, and the plug is coupled to the optical module so as to position the distal end of the transmitting optical fiber in relation to the optical device of the optical module. An example of the configuration of such an optical module and a plug or an optical coupler equipped with the optical module and the plug will be described with reference to FIG. 5.

FIG. 5 shows the configuration of a conventional optical coupler. As illustrated in FIG. 5, an optical coupler 400 is equipped with a light emitting module 200 and a plug 300. The light emitting module 200 has a package 202. The package 202 is an approximately hexahedral housing that opens upward. Installed in the package 202 is a silicon substrate 204. A semiconductor laser device 206 is fixed at a predetermined position of the top surface of the silicon substrate 204.

The light emitting module 200 is provided with a connecting optical fiber 208 and a ferrule 210. The connecting optical fiber 208 is an optical fiber that has been cut to a predetermined length, the end surface at one side being fixed between the silicon substrate 204 and a holding plate 212 such that it is positioned in relation to the light emitting portion of the semiconductor laser device 206.

The end at the other side of the connecting optical fiber 208 is secured in the ferrule 210 with an adhesive agent so that an end surface 208a, which has been polished to have a convex spherical surface, juts out of the ferrule 210. The ferrule 210 is secured to the package 202 via a flange 210a that has been integrally formed therewith.

Formed on one end of the package 202 is a pair of recessed portions 202a and 202a that open outwardly. The recessed portions 202a and 202a are used for coupling the plug 300. The top open part of the package 202 is covered with a lid which is not shown and which is installed after completing the assembly of the light emitting module 200.

The plug 300 is provided with a housing 302 and a ferrule 304. The plug 300 is attached to the distal end portion of the transmitting optical fiber by inserting the distal end portion of a transmitting optical fiber cable C to be connected, a sheath of the distal end portion being removed, into the ferrule 304 and by securing it therein. The distal end portion of the transmitting optical fiber is also polished to have a convex spherical surface and disposed so that it juts out of the ferrule 304.

The housing 302 has a pair of engaging portions 302a and 302a that engage the recessed portions 202a of the package 202 to couple the housing 302 to the package 202.

The optical coupler 400 is configured such that, when the engaging portions 302a are engaged with the recessed portions 202a to couple the light emitting module 200 to the plug 300, the distal end of the ferrule 210 of the light emitting module 200 is brought near the distal end of the ferrule 304 of the plug 300. Then, the distal end 208a, which has the convex spherical surface, of the connecting optical fiber 208 is abutted against the distal end, which has the convex spherical surface, of the transmitting optical fiber. The distal ends of the ferrule 210 and 304 are inserted in a cylindrical split sleeve 306 to align the ferrules 210 and 304 and to also align the distal end 208a, which has the convex spherical surface, of the connecting optical fiber 208 with the distal end, which has the convex spherical surface, of the transmitting optical fiber.

A light detecting module equipped with a light detecting device as an optical device also has a like configuration.

SUMMARY OF THE INVENTION

The present invention provides an optical module, an optical fiber connecting plug, or an optical coupler equipped with the same, which is capable of connecting optical fibers without using a ferrule. The optical module, the optical fiber connecting plug, and the optical coupler equipped with the same comprise a substrate, an optical device mounted on the substrate, and a connecting optical fiber having one end thereof positioned in with respect to the optical device. The distal end of a transmitting optical fiber to be connected is positioned with respect to the other end thereof.

The optical module, the optical fiber connecting plug, and the optical coupler equipped with the same further comprise a guide for guiding the distal end of the transmitting optical fiber to be connected.

The distal end of the transmitting optical fiber is positioned in relation to the other end of the connecting optical fiber by placing the distal end of the transmitting optical fiber in the guide.

DETAILED DESCRIPTION OF THE PREFERRED EMBODIMENTS

With reference to the accompanying drawings, preferred embodiments of an optical module, an optical fiber connecting plug, and an optical coupler equipped with the optical module and the optical fiber connecting plug in accordance with the present invention will now be described in detail.

The accompanying drawings merely schematically illustrate the sizes and configurations of constituents, and positional relationships there between to aid the understanding of the present invention. Therefore, it should be understood that the present invention is not limited to the embodiments shown in the accompanying drawings.

Figure 1:
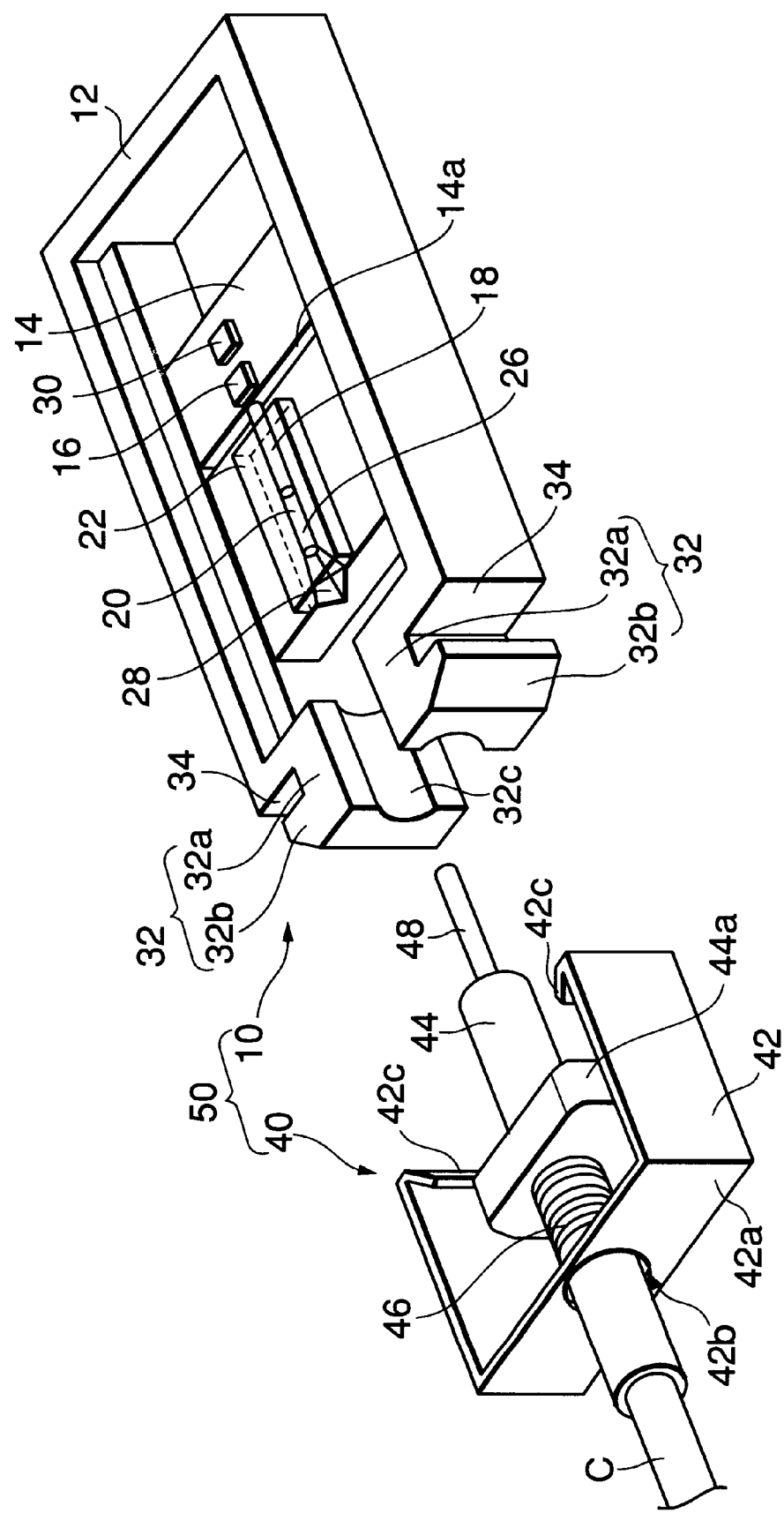
FIG. 1 is a perspective view illustrating the configuration of an optical coupler in accordance with a first embodiment.
Figure 2:
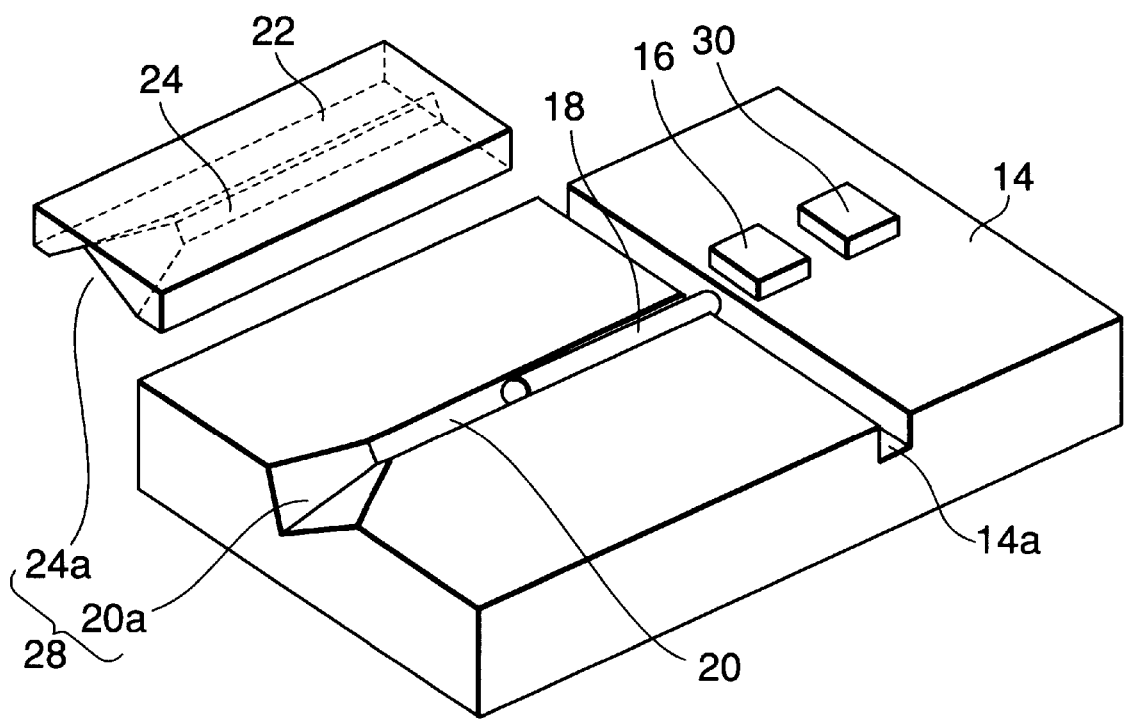
FIG. 2 is an exploded perspective view illustrating a substrate, a connecting optical fiber, and a holding plate used for a light emitting module of the optical coupler in accordance with the first embodiment.

FIG. 1 is a perspective view showing the configuration of an optical coupler of a first embodiment in accordance with the present invention. FIG. 2 is an exploded perspective view showing mainly a substrate and a holding plate used for a light emitting module of the optical coupler of the first embodiment.

As shown in FIG. 1, an optical coupler 50 is provided with a light emitting module 10 and a plug 40.

The light emitting module 10 is a so-called receptacle type module and it is equipped with a package 12. The package 12 is an approximately hexahedral housing that opens upwardly, and it is integrally molded using an epoxy resin or the like. A silicon substrate 14 is installed in the package 12. A semiconductor laser device 16 for converting external electrical signals into optical signals is secured by soldering or the like at a predetermined position of the top surface of the silicon substrate 14. Electrical signals are supplied to the semiconductor laser device 16 by a wiring pattern, which is not shown.

The light emitting module 10 is equipped with a connecting optical fiber 18. The connecting optical fiber 18 is an optical fiber which has been cut to a predetermined length and which has a diameter (approximately 126 to 128 $\mu$m) larger than the diameter (approximately 125 $\mu$m) of the transmitting optical fiber connected to the light emitting module 10 so as to send optical signals to outside the light emitting module.

As shown in FIG. 2, a V groove (a first groove portion) 20 having a V-shaped section is formed in the top surface of the silicon substrate 14. The V groove 20 extends from a transverse groove 14a, which is formed at a position adjoining the semiconductor laser device 16, to one lengthwise end of the silicon substrate 14. The V groove 20 is formed by alkali etching that employs, for example, KOH. In this light emitting module 10, the width of the open end of V groove 20 is approximately 140 $\mu$m.

A hexahedral holding plate 22 made of glass is secured to the top surface of the silicon substrate 14 by, for example, a UV-curing adhesive agent. The bottom surface of the holding plate 22 is provided with a V groove (a second groove portion) 24 that extends lengthwise from one end to the other of the bottom surface.

The V grooves 20 and 24 have nearly the same sectional shape. The V grooves 20 and 24 are configured such that they form a bore which is able to house the connecting optical fiber 18 while it is brought in contact with the outer peripheral surface of the connecting optical fiber and which has a foursquare (rectangular) section when the open ends of the V grooves are aligned with each other. In the section of the bore formed by the V grooves 20 and 24, the opposed sides are placed away from each other by a distance nearly equal to the outside diameter of the connecting optical fiber 18.

In the light emitting module 10, the holding plate 22 is installed on the top surface of the silicon substrate 14 such that the open end of the V groove 24 is aligned with the open end of the V groove 20 of the silicon substrate 14. Hence, the V grooves 20 and 24 form the bore which houses the connecting optical fiber 18 while in contact with the outer peripheral surface thereof, and which has a rectangular section. The bore has a sectional shape that has a larger dimension than the diameter of the transmitting optical fiber. The bore extends from the position adjoining the semiconductor laser device 16 to one end of the silicon substrate 14 and it opens outwardly. The connecting optical fiber 18 is fixed in a portion of the bore (a first bore portion) which is closest to the semiconductor laser device 16. The remainder of the bore constitutes a second bore portion (a guide or leading portion) 26 that opens outwardly. Thus, the distal end of the transmitting optical fiber can be positioned in relation to a first end surface of the connecting optical fiber 18 by disposing the distal end of the transmitting optical fiber in the second bore 26.

The V grooves 20 and 24 are configured so that a second end surface of the connecting optical fiber 18 is positioned with high accuracy in relation to the light emitting portion of the semiconductor laser device 16, which has been installed at the predetermined position of the silicon substrate 14, when the connecting optical fiber 18 is housed. Hence, the connecting optical fiber 18 is disposed in the bore formed by the V grooves 20 and 24. When the second end of the connecting optical fiber 18 is jutted out of the bore by a predetermined length toward the semiconductor laser device 16, the surface on that second end is positioned with high accuracy in relation to the light emitting portion of the semiconductor laser device 16.

The ends of the V grooves 20 and 24 located opposite the semiconductor laser device 16 have slope portions 20a and 24a, the widths and depths of which gradually increase outwardly. Thus, the open end portion of the second bore 26 is constituted by the slope portions 20a and 24a providing a diverging portion 28 that diverges outwardly.

A photodiode device 30 is installed near a side of the semiconductor laser device 16 opposite from the connecting optical fiber 18. The photodiode device 30 has a function of monitoring laser beams emitted from the rear of the semiconductor laser device 16.

A coupling portion used for coupling the light emitting module 10 to the plug 40 is formed at one lengthwise end of the package 12. The coupling portion is composed of a pair of protuberances 32 and 32, each of which is equipped with a first portion 32a that extends outwardly in the lengthwise direction from one longitudinal end surface of the package 12 and a second portion 32b that bends outwardly in the direction of the width of the package 12 at the distal end of the first portion 32a. The opposed surfaces of the first portions 32a have a shape that is complementary with respect to the outer periphery of a cylindrical holder of the plug 40, and they form a recessed surface (a receiving portion) 32c shaped to receive (abut against) a part of the outer peripheral surface of the cylindrical holder. A recessed portion 34 that opens outwardly in the direction of the width of the package is formed between each second portion 32b and the package 12.

The top open portion of the package 12 is covered by a lid, which is not shown.

The plug 40 is equipped with a housing 42 that is integrally molded using an epoxy resin or the like. The housing 42 opens upwardly, and it is provided with side walls and has an approximately U-shaped cross section. The plug 40 is provided with a cylindrical holder 44. The holder 44 is a cylindrical member formed of ceramic such as zirconia or glass. Formed inside the holder 44 is a bore in which the transmitting optical fiber can be inserted. The holder 44 is mounted on the housing 42 by being inserted in an opening 42b formed in a U-shaped bottom surface 42a of the housing 42. The plug 40 is installed on a distal end of a transmitting optical fiber cable C by a distal end portion 48 which is inserted in the holder 44 and fixed therein, the distal end portion 48 being a portion of the transmitting optical fiber cable C to be connected, the sheath of which has been removed. The transmitting optical fiber is disposed relative to the holder 44 so that the distal end portion 48 juts out of the holder 44 a predetermined length. This end portion 48 is fixed to the holder 44 with an adhesive agent. A spring 46 is installed between a flange 44a formed on the holder 44 and a bottom surface 42a of the housing 42.

The housing 42 engages with the recessed portions 34 of the package 12, and it is provided with a pair of engaging portions 42c for coupling the housing 42 to the package 12.

The projecting length of the distal end portion 48 of the transmitting optical fiber and the dimensions and shapes of the respective portions of the plug 40 are set such that the distal end portion 48 of the transmitting optical fiber is disposed in the second bore 26, and so that the distal end of the distal end portion 48 is positioned in relation to the first end of the connecting optical fiber 18 (i.e. so that optical signals sent through the connecting optical fiber 18 are efficiently supplied to the distal end of the transmitting optical fiber) when the outer peripheral surface of the holder 44 is received by the recessed surface 32c. The engaging portions 42c are shaped so as to engage the recessed portions 34 so as to couple the plug 40 to the light emitting module 10.

In this embodiment, the distal end of the transmitting optical fiber and the first end of the connecting optical fiber 18 have been machined to have planes. The optical coupler 50 is configured so that the distal end of the transmitting optical fiber is abutted against the first end of the connecting optical fiber 18 when the plug 40 is coupled to the light emitting module 10. The optical coupler 50 in this embodiment is configured such that the flange 44a of the holder 44 is urged by the spring 46 toward the light emitting module 10 and the distal end of the transmitting optical fiber housed in the holder 44 is pressed by a given force with respect to the first end of the connecting optical fiber 18 when the plug 40 is coupled to the light emitting module 10.

The top open part of the housing 42 is covered by a lid, which is not shown.

In the optical coupler 50 in this embodiment, the transmitting optical fiber is connected to the light emitting module 10 by bringing the plug 40 close to the module 10 while holding the outer peripheral surface of the holder 44 against the recessed surface 32c of the light emitting module 10 and by engaging the engaging portions 42c with the recessed portions 34. This operation causes the distal end portion 48 of the transmitting optical fiber to be disposed in the second bore portion 26 and the distal end of the distal end portion 48 to be positioned with respect to the first end of the connecting optical fiber 18. The outer peripheral surface of the holder 44 has been received in the recessed surface 32c of the light emitting module 10. Thus, the movement of the plug 40 relative to the light emitting module 10 in a direction orthogonal to the axial direction of the transmitting optical fiber is suppressed. As a result, the changes in the distance between the distal end of the transmitting optical fiber and the first end of the connecting optical fiber attributable to such movement will be suppressed.

According to the optical coupler 50 having the configuration described above, the transmitting optical fiber can be connected to the light emitting module 10 simply by coupling the plug 40 to the light emitting module 10 while inserting the distal end portion 48 of the transmitting optical fiber in the second bore portion 26 of the light emitting module 10. Hence, it becomes possible to connect a light emitting module to a transmitting optical fiber without using an expensive part such as a ferrule. Furthermore, the second bore portion 26 is provided with the diverging portion 28 and the second bore portion has a section having a larger diameter than the outside diameter of the transmitting optical fiber. Hence, the transmitting optical fiber can be easily inserted in the second bore portion 26.

In the optical coupler 50 in this embodiment, the flange 44a of the holder 44 is urged by the spring 46 toward the light emitting module 10 when the plug 40 is coupled to the light emitting module 10. Further, the distal end of the transmitting optical fiber housed in the holder 44 is pressed by a given force against the first end of the connecting optical fiber 18. Therefore, even if the light emitting module 10 and the plug 40 move relative to each other, the contact between the distal end of the transmitting optical fiber and the first end of the connecting optical fiber 18 will be maintained.

Figure 3:
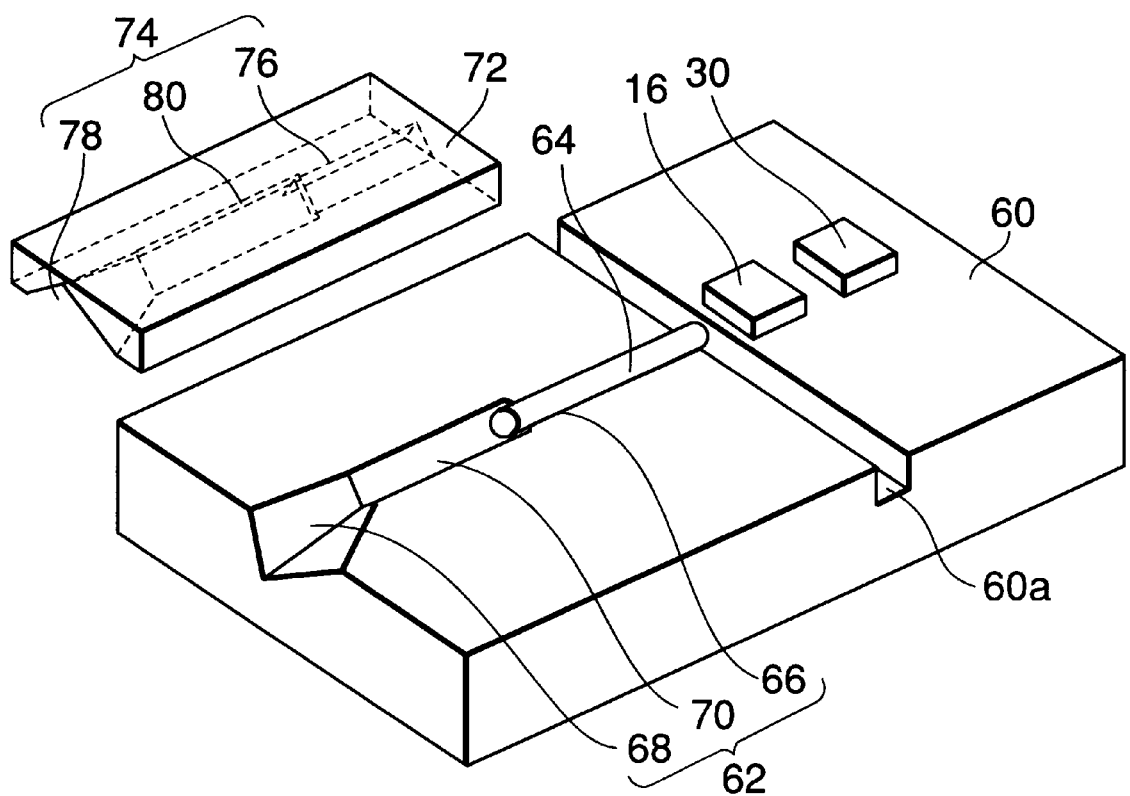
FIG. 3 is a schematic exploded perspective view illustrating a substrate, a connecting optical fiber, and a holding plate used for a light emitting module of the optical coupler in accordance with a second embodiment.

An optical coupler of a second embodiment will now be described. FIG. 3 is an exploded perspective view showing a substrate, a connecting optical fiber, and a holding plate used for the optical coupler of the second embodiment.

The optical coupler of the second embodiment differs from the optical coupler 50 of the first embodiment in that the diameter of the connecting optical fiber is equal to the diameter of the transmitting optical fiber, and the dimensions of the first bore portion are different from those of the second bore portion. The rest of the configuration is identical to that of the optical coupler of the first embodiment. Hence, only the different aspects will be described. In FIG. 3, the same components as those of the first embodiment will be assigned the same reference numerals as those in the first embodiment.

As shown in FIG. 3, a V groove (a first groove) 62 having a V-shaped section is formed in the top surface of a silicon substrate 60 of the optical coupler of the second embodiment. The V groove 62 extends from a transverse groove 60a provided at a location adjoining a semiconductor laser device 16 to one lengthwise end of the silicon substrate 60. The V groove 62 is constructed of a connecting optical fiber housing portion 66 which is positioned at one side of the semiconductor laser device 16 and which accommodates a connecting optical fiber 64, a slope portion 68 which is positioned at one lengthwise end of the silicon substrate 60 and which is formed so that the width and depth increase outwardly, and a transmitting optical fiber housing portion 70 disposed between the connecting optical fiber housing portion 66 and the slope portion 68.

A hexahedral holding plate 72 made of glass is secured to the top surface of the silicon substrate 60 by, for example, a UV-curing adhesive agent. The bottom surface of the holding plate 72 is provided with a V groove (a second groove) 74 that extends lengthwise from one end to the other of the bottom surface.

The V groove 74 has the same shape as the V groove 62. More specifically, the V groove 74 is formed of a connecting optical fiber housing portion 76 which is positioned at the side of the semiconductor laser device 16 and which accommodates the connecting optical fiber 64, a slope portion 78 which is positioned at one lengthwise end of the holding plate 72 and which diverges outwardly, and a transmitting optical fiber housing portion 80 disposed between the connecting optical fiber housing portion 76 and the slope portion 78.

The holding plate 72 is installed on the top surface of the silicon substrate 60 such that the open end of the V groove 74 is aligned with the open end of the V groove 62 of the silicon substrate 60. The holding plate 72 is installed on the silicon substrate 60 such that the open end of the connecting optical fiber housing portion 76 is aligned with the open end of the connecting optical fiber housing portion 66 of the silicon substrate 60, the open end of the transmitting optical fiber housing portion 80 is aligned with the open end of the transmitting optical fiber housing portion 70 of the silicon substrate 60, and the open end of the slope 78 is aligned with the open end of the slope portion 68 of the silicon substrate 60, respectively.

The connecting optical fiber housing portions 66 and 76 are configured so that, when the opening ends thereof are aligned with each other, they form a bore (a first bore portion) which is able to house the connecting optical fiber 64 while it is in contact with the outer peripheral surface thereof and which has a foursquare (rectangular) section.

In the section of the first bore portion formed by the connecting optical fiber housing portions 66 and 76, the opposed sides are placed away from each other by a distance nearly equal to the outside diameter of the connecting optical fiber 64.

The depths and widths of the transmitting optical fiber housing portions 70 and 80 are set to be larger than those of the connecting optical fiber housings 66 and 76. The bore (the second bore portion, the guide, or the leading portion) formed by the transmitting optical fiber housing portions 70 and 80 has therefore a section that is larger than the outside diameter of the transmitting optical fiber to be connected. This permits easier insertion of the transmitting optical fiber.

Having the section that is larger than the outside diameter of the transmitting optical fiber means that the transmitting optical fiber is able to move in the guide in the direction orthogonal to the axis thereof The slope portions 68 and 78 constitute a diverging portion that diverges outwardly.

The connecting optical fiber 64 has the same diameter as the transmitting optical fiber. The connecting optical fiber 64 is fixed in the first bore made up of the transmitting optical fiber housing portions 70 and 80 such that the second end of the connecting optical fiber 64 is positioned in relation to the light emitting portion of the semiconductor laser device 16, and the first end juts out in the second bore portion.

In the optical coupler of the second embodiment having such a configuration, the distal end of the transmitting optical fiber can be positioned in relation to the first end of the connecting optical fiber to connect the transmitting optical fiber to the semiconductor laser device 16 of the light emitting module simply by inserting the distal end portion of the transmitting optical fiber through the diverging portion formed by the slope portions 68 and 78 and disposing it in the bore (the second bore portion, the guide, or the leading portion) formed by the transmitting optical fiber housing portions 70 and 80.

In the optical coupler of the second embodiment, the optical fiber having the same diameter as the transmitting optical fiber is employed for the connecting optical fiber. The optical coupler of the second embodiment provides an additional advantage in that the optical fiber for the transmitting optical fiber can also be used for the connecting optical fiber.

Figure 4:
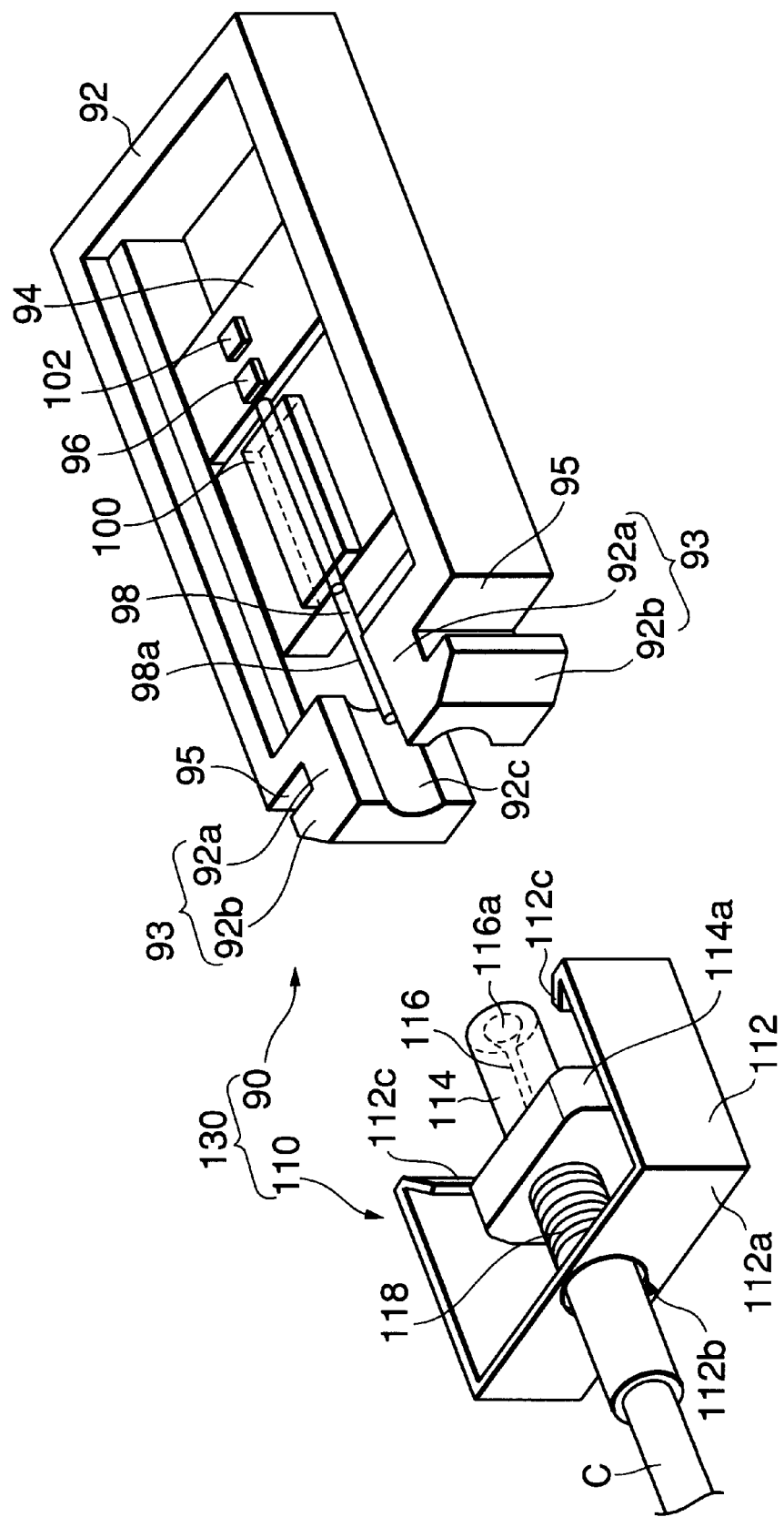
FIG. 4 is a perspective view illustrating the configuration of an optical coupler in accordance with a third embodiment.
Figure 5:
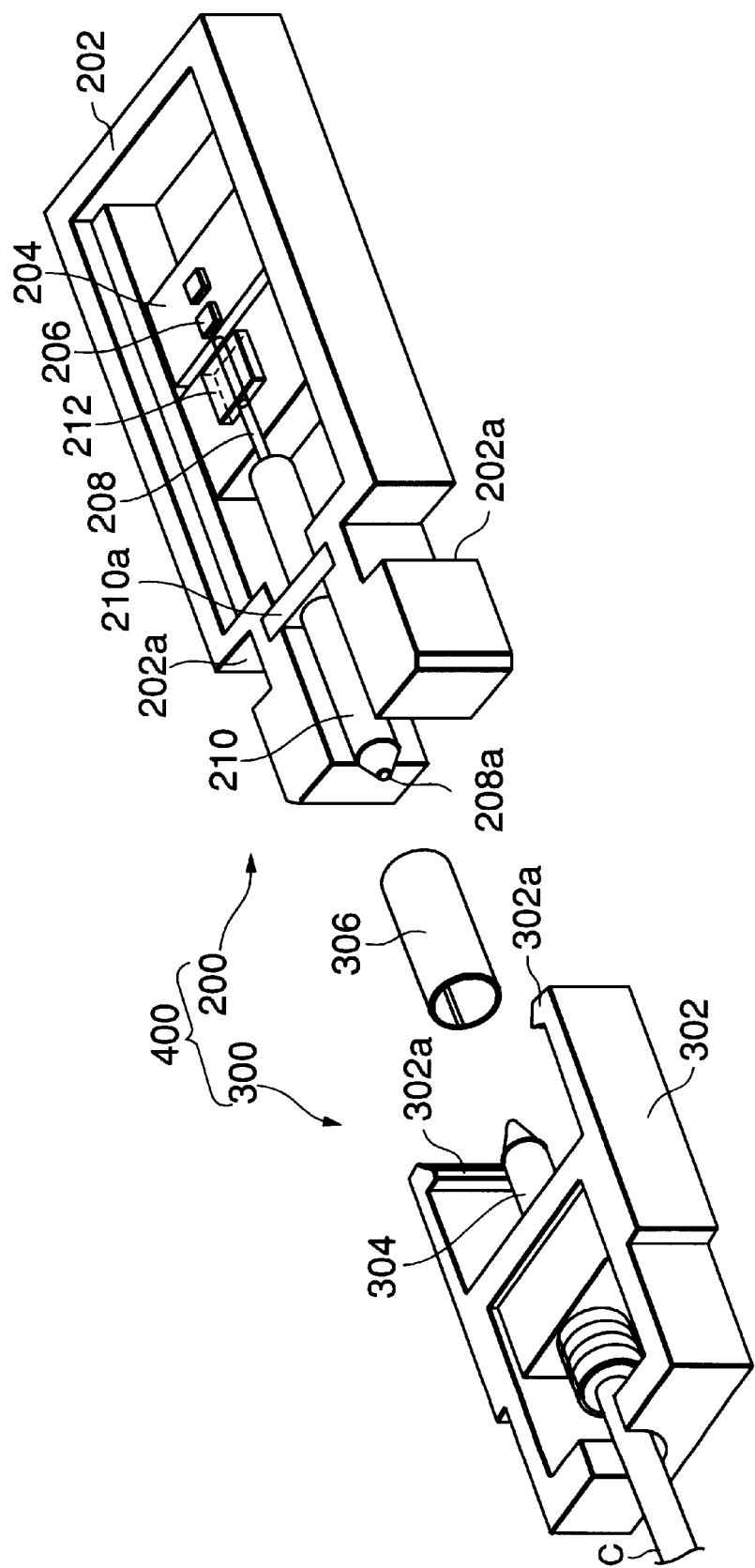
FIG. 5 is a perspective view illustrating the configuration of a conventional optical coupler.

Referring now to FIG. 4, an optical coupler 130 of a third embodiment will now be described.

FIG. 4 is a perspective view illustrating the configuration of the optical coupler 130 of the third embodiment in accordance with the present invention.

As shown in FIG. 4, the optical coupler 130 is equipped with a light emitting module 90 and a plug 110.

The light emitting module 90 is a so-called receptacle type module and it is equipped with a package 92. The package 92 is an approximately hexahedral housing that opens upwardly, and it is integrally molded using an epoxy resin or the like. A silicon substrate 94 is installed in the package 92. A semiconductor laser device 96 for converting external electrical signals into optical signals is secured by soldering or the like at a predetermined position on the top surface of the silicon substrate 94. Electrical signals are supplied to the semiconductor laser device 96 by a wiring pattern, which is not shown.

The light emitting module 90 is equipped with a connecting optical fiber 98. The connecting optical fiber 98 has the same diameter as the diameter (approximately 125 µm) of the transmitting optical fiber connected to the light emitting module 90 so as to send optical signals to outside the light emitting module. The connecting optical fiber 98 is secured to the silicon substrate 94.

A hexahedral holding plate 100 made of glass is secured to the top surface of the silicon substrate 94 by, for example, a UV-curing adhesive agent. The top surface of the silicon substrate 94 and the bottom surface of the holding plate 100 are provided with V grooves. The two V grooves have the same sectional shapes. These two V grooves are formed such that they form a bore which is able to accommodate the connecting optical fiber 98 while it is in contact with the outer peripheral surface thereof and which has a foursquare (rectangular) section when the open ends thereof are aligned with each other.

In the light emitting module 90, the holding plate 100 is secured to the top surface of the silicon substrate 94 such that the open end of the V groove is aligned with the open end of the V groove of the silicon substrate 94. One end of the connecting optical fiber 98 is fixed in the bore by an adhesive agent or the like. Hence, in the light emitting module 90, the silicon substrate 94 serves as the mounting portion for the connecting optical fiber 98.

These V grooves are configured so that a second end surface of the connecting optical fiber 98 is positioned with high accuracy in relation to the light emitting portion of the semiconductor laser device 96, which has been installed at the predetermined position of the silicon substrate 94, when the second end of the connecting optical fiber 98 is housed therein. When the connecting optical fiber 98 is disposed in the bore formed by the V grooves, and the second end thereof is jutted out of the bore by a predetermined length toward the semiconductor laser device 96, the end surface on that second end is positioned with high accuracy in relation to the light emitting portion (active layer) of the semiconductor laser device 96.

A portion 98a on the first end of the connecting optical fiber 98 juts out of the silicon substrate 94 which serves as the mounting portion.

A photodiode device 102 is installed at a position opposite from the connecting optical fiber 98 of the semiconductor laser device 96. The photodiode device 102 has a function of monitoring laser beams emitted from the rear of the semiconductor laser device 96.

A coupling portion used for coupling the light emitting module 90 to the plug 110 is formed at one lengthwise end of the package 92. The coupling portion is composed of a pair of protuberances 93 and 93, each of which is equipped with a first portion 92a that extends outwardly in the lengthwise direction from one longitudinal end surface of the package 92 and a second portion 92b that bends outwardly in the direction of the width of the package 92 at the distal end of the first portion 92a. The opposed surfaces of the first portion 92a have a shape that is complementary with respect to the outer periphery of a cylindrical holder of the plug 110 and they form a recessed surface (a receiving portion) 92c shaped to receive (abut against) a part of the outer peripheral surface thereof. A recessed portion 95 that opens outwardly in the direction of the width of the package is formed between each second portion 92b and the package 92.

In the light emitting module 90, the portion 98a on the first end of the connecting optical fiber 98 that juts out from the silicon substrate 94 on which it is mounted terminates between the recessed surfaces 92c and 92c, so that the connecting optical fiber 98 does not extend beyond the package 92.

The top open portion of the package 92 is covered by a lid, which is not shown.

The plug 110 is equipped with a housing 112 that is integrally molded using an epoxy resin or the like. The housing 112 opens upwardly, and it is provided with side walls and has an approximately U-shaped cross section. The plug 110 is provided with a cylindrical holder 114. The holder 114 is attached to the housing 112 by being inserted in an opening 112b formed in a U-shaped bottom surface 112a of the housing 112.

The holder 114 is a cylindrical member formed of ceramic such as zirconia or glass. The holder 114 has a through hole 116 that runs in the axial direction at the center thereof. The through hole 116 has an inside diameter that is nearly equal to the outside diameters of the connecting optical fiber 98 and the transmitting optical fiber. A first end (the end to be connected to the light emitting module 90) of the through hole 116 is provided with a diverging portion 116a, the diameter of which increases outwardly.

The plug 110 is attached to the distal end portion of the transmitting optical fiber cable C by inserting the distal end portion, from which the sheath has been removed, of the transmitting optical fiber cable C to be connected from the other end of the through hole 116 to a midpoint, and fixing it thereto. In this embodiment, a portion (the portion on the other end) that projects from the silicon substrate 94 of the connecting optical fiber 98 is inserted in the remainder (the leading portion) of the through hole 116.

A spring 118 is installed between a flange 114a formed on the holder 114 and the bottom surface 112a of the housing 112.

The housing 112 is provided with a pair of engaging portions 112c that engage recessed portions 95 of the package 92 to couple the housing 112 to the package 92.

The projecting length of the connecting optical fiber 98 from the silicon substrate 94 serving as the mounting portion, and the dimensions and shapes of the respective portions of the plug 110 are set such that the portion (the portion on the first end) of the connecting optical fiber 98 that extends from the silicon substrate 94 is disposed in the through hole 116 of the holder 114 and the distal end of the other distal end portion is positioned in relation to the distal end of the transmitting optical fiber (i.e. optical signals sent through the connecting optical fiber 98 are efficiently supplied to the distal end of the transmitting optical fiber) when the outer peripheral surface of the holder 114 is received by the recessed surface 92c and the engaging portions 112c are engaged with the recessed portions 95 so as to couple the plug 110 to the light emitting module 90. In this embodiment, the distal end of the transmitting optical fiber and the first end of the connecting optical fiber 98 have been machined to have planes. The optical coupler 130 is configured so that the distal end of the transmitting optical fiber is abutted against the first end of the connecting optical fiber 98 when the plug 110 is coupled to the light emitting module 90.

In the optical coupler 130 of this embodiment, the flange 114a of the holder 114 is urged by the spring 118 toward the light emitting module 90 when the plug 110 is coupled to the light emitting module 90. At this time, the holder 114 is pressed by a given force with respect to the first end of the connecting optical fiber 98.

The top open part of the housing 112 is covered by a lid, which is not shown.

In the optical coupler 130 in this embodiment, the transmitting optical fiber is connected to the light emitting module 90 by bringing the plug 110 close to the light emitting module 90 while holding the outer peripheral surface of the holder 114 against the recessed surface 92c of the light emitting module 90 and by engaging the engaging portions 112c with the recessed portions 95. This operation causes the distal end portion of the connecting optical fiber 98 to be inserted in the through hole 116 from one end of the through hole 116 of the holder 114. Further, the other end portion of the connecting optical fiber 98 is disposed in the through hole 116, and the distal end of the first end portion is positioned with respect to the distal end of the transmitting optical fiber.

The outer peripheral surface of the holder 114 has been received in the recessed surface 92c of the light emitting module 90. Thus, the movement of the plug 110 relative to the light emitting module 90 in a direction orthogonal to the axial direction of the transmitting optical fiber is suppressed. As a result, the changes in the distance between the distal end of the transmitting optical fiber and the first end of the connecting optical fiber attributable to such movement will be suppressed.

According to the optical coupler 130 having the configuration described above, the transmitting optical fiber can be connected to the light emitting module 90 simply by coupling the plug 110 to the light emitting module 90 while inserting the other end portion of the connecting optical fiber 98 in the through hole 116 provided in the plug 110. Hence, it becomes possible to connect a light emitting module to a transmitting optical fiber without using an expensive part such as a ferrule.

In the optical coupler 130 in this embodiment, the flange 114a of the holder 114 is urged by the spring 118 toward the light emitting module 90 when the plug 110 is coupled to the light emitting module 90. At this time, the holder 114 is pressed by a given force against the other end of the connecting optical fiber 98. Therefore, even if the light emitting module 90 and the plug 110 move relative to each other, the contact between the distal end of the transmitting optical fiber and the other end of the connecting optical fiber 98 will be maintained.

Further, in the optical coupler 130 of this embodiment, the portion 98a at the other end of the connecting optical fiber 98 of the light emitting module 90 terminates between the recessed surfaces 92c and 92c. Hence, the connecting optical fiber 98 does not extend beyond the package 92. The distal end of the transmitting optical fiber is disposed in the through hole 116 of the plug 110. Therefore, neither the transmitting optical fiber nor the connecting optical fiber is exposed outside. This minimizes the possibility of damage to the transmitting optical fiber and the connecting optical fiber.

Figure 6:
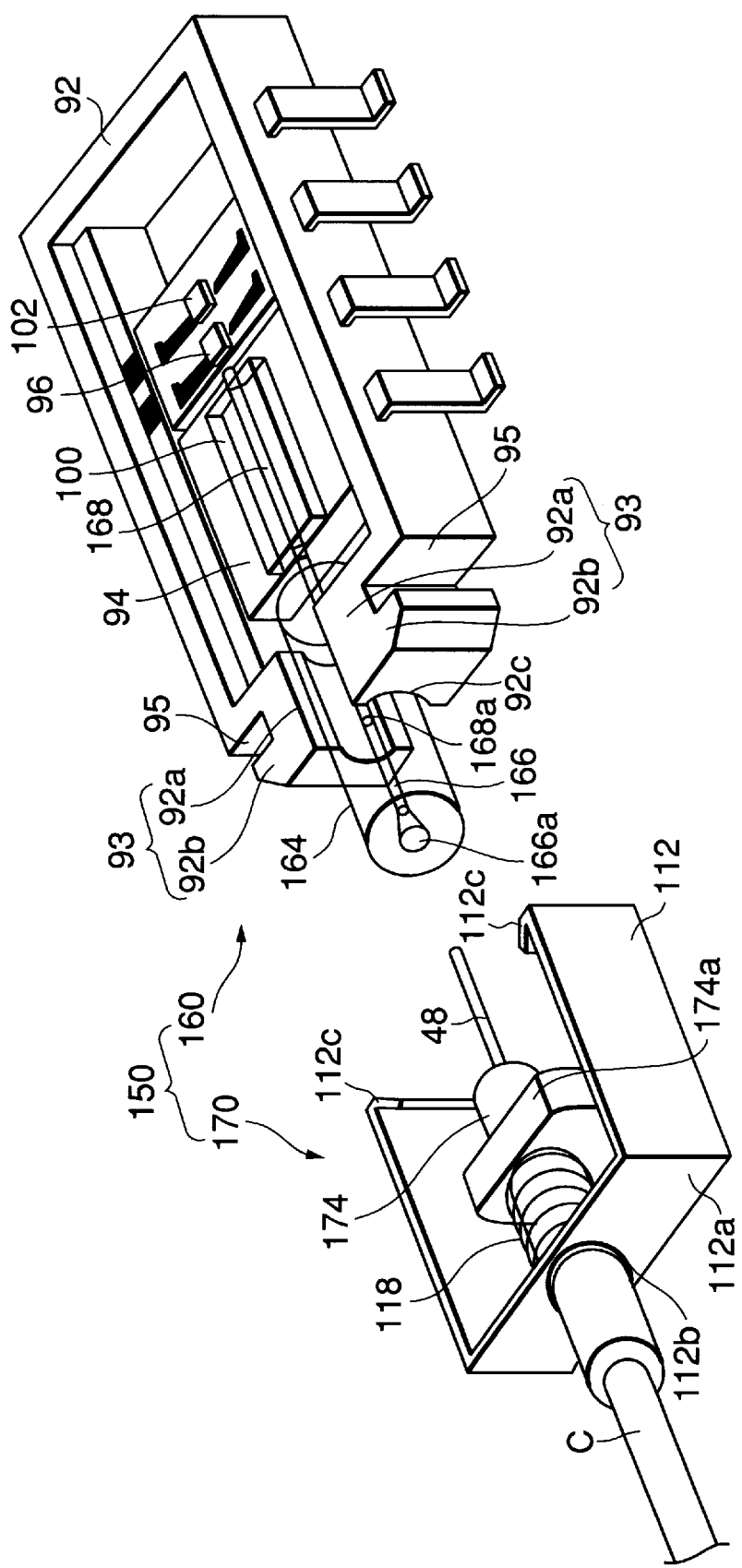
FIG. 6 is a perspective view illustrating the configuration of an optical coupler in accordance with a fourth embodiment.

Referring now to FIG. 6, an optical coupler 150 of a fourth embodiment will be described. FIG. 6 is a perspective view showing the configuration of the optical coupler 150 of the fourth embodiment in accordance with the present invention.

The optical coupler of the fourth embodiment differs from the optical coupler 130 of the third embodiment in that a sleeve is provided between the recessed surfaces 92c and 92c of the light emitting module, and that the distal end of a transmitting optical fiber is abutted against the other end of a connecting optical fiber 168 in a through hole of the sleeve. Therefore, only the different aspects will be described. In FIG. 6, the same components as those of the third embodiment will be assigned the same reference numerals as those in the third embodiment.

As shown in FIG. 6, the optical coupler 150 is equipped with a light emitting module 160 and a plug 170.

The light emitting module 160 is a so-called receptacle type module and it is equipped with a package 92. The package 92 is an approximately hexahedral housing that opens upwardly, and it is integrally molded using an epoxy resin or the like.

The light emitting module 160 is provided with the connecting optical fiber 168. The connecting optical fiber 168 has the same diameter as the diameter (approximately 125 μm) of the transmitting optical fiber connected to the light emitting module 160 so as to send optical signals to outside the light emitting module 162. The connecting optical fiber 168 is secured to the silicon substrate 94.

A hexahedral holding plate 100 made of glass is secured to the top surface of the silicon substrate 94 by, for example, a UV-curing adhesive agent. The top surface of the silicon substrate 94 and the bottom surface of the holding plate 100 are provided with V grooves. The two V grooves have the same sectional shapes. These two V grooves are formed such that they form a bore which is able to accommodate the connecting optical fiber 168 while it is in contact with the outer peripheral surface thereof and which has a foursquare (rectangular) section when the open ends thereof are aligned with each other.

In the light emitting module 160, the holding plate 100 is secured to the top surface of the silicon substrate 94 such that the open end of the V groove is aligned to the open end of the V groove of the silicon substrate 94. One end of the connecting optical fiber 168 is fixed in the bore by an adhesive agent or the like. Hence, in the light emitting module 160, the silicon substrate 94 serves as the mounting portion for the connecting optical fiber 168.

These V grooves are configured so that a second end surface of the connecting optical fiber 168 is positioned with high accuracy in relation to the light emitting portion of the semiconductor laser device 96, which has been installed at the predetermined position of the silicon substrate 94, when the second end of the connecting optical fiber 168 is housed therein. The connecting optical fiber 168 is disposed in the bore formed by the V grooves. Further, when a first end of the connecting optical fiber 168 is jutted out of the bore by a predetermined length toward the semiconductor laser device 96, the end surface on that first end is positioned with high accuracy in relation to the light emitting portion (active layer) of the semiconductor laser device 96.

An end surface 168a, which has been polished into a convex spherical surface, at the other end of the connecting optical fiber 168 is inserted as far as a midpoint of a through hole 166 of a sleeve 164, which will be discussed later, and it is fixed in the sleeve 164 by an adhesive agent.

A photodiode device 102 is installed at the position opposite from the connecting optical fiber 168 of the semiconductor laser device 96. The photodiode device 102 has a function of monitoring laser beams emitted from the rear of the semiconductor laser device 96.

A coupling portion used for coupling the light emitting module 160 to the plug 170 is formed at one lengthwise end of the package 92. The coupling portion has a pair of protuberances 93 and 93, each of which is equipped with a first portion 92a that extends outwardly in the lengthwise direction from one longitudinal end surface of the package 92 and a second portion 92b that bends outwardly in the direction of the width of the package 92 at the distal end of the first portion 92a. The opposed surfaces of the first portion 92a have a shape that is complementary with respect to the outer periphery of a cylindrical holder of the plug 170, and they form a recessed surface (a receiving portion) 92c shaped to receive (abut against) a part of the outer peripheral surface thereof. A recessed portion 95 that opens outwardly in the direction of the width of the package is formed between each second portion 92b and the package 92.

The sleeve 164 has a through hole 166 that runs in the axial direction at the center thereof. The through hole 166 has an inside diameter that is nearly equal to the outside diameters of the connecting optical fiber 168 and the transmitting optical fiber. The other end (the end to be connected to the plug 170) of the through hole 166 is provided with a diverging portion 166a, the diameter of which increases outwardly.

The sleeve 164 is fixed by gluing or the like between the recessed surfaces 92c and 92c of the light emitting module 160. The sleeve 164 is disposed such that it juts from the package 92.

The top open portion of the package 92 is covered by a lid, which is not shown.

The plug 170 is equipped with a housing 112 that is integrally molded using an epoxy resin or the like. The housing 112 opens upwardly, and it is provided with side walls and has an approximately U-shaped cross section. The plug 170 is provided with a cylindrical holder 174. The holder 174 is attached to the housing 112 by being inserted in an opening 112b formed in a U-shaped bottom surface 112a of the housing 112. The holder 174 is a cylindrical member formed of ceramic such as zirconia or glass. A bore in which a transmitting optical fiber can be inserted is formed in the holder 174.

The plug 170 is attached to the distal end portion of a transmitting optical fiber cable C by inserting the transmitting optical fiber cable C, which is to be connected, in the holder 174 and fixing it thereto, the sheath having been removed from the transmitting optical fiber cable C. A distal end portion 179 of the transmitting optical fiber is disposed with respect to the holder 174 such that it juts out of the holder 174 by a predetermined length. The transmitting optical fiber is fixed to the holder 174 by an adhesive agent.

In this embodiment, the distal end portion 179 from which the sheath of the transmitting optical fiber cable to be connected has been removed is inserted in a through hole 166a provided in the sleeve 166 of the connecting optical fiber 168.

A spring 118 is installed between a flange 174a formed on the holder 174 and a bottom surface 112a of the housing 112.

The housing 112 is provided with a pair of engaging portions 112c that engage recessed portions 95 of the package 92 to couple the housing 112 to the package 92.

Figure 7:
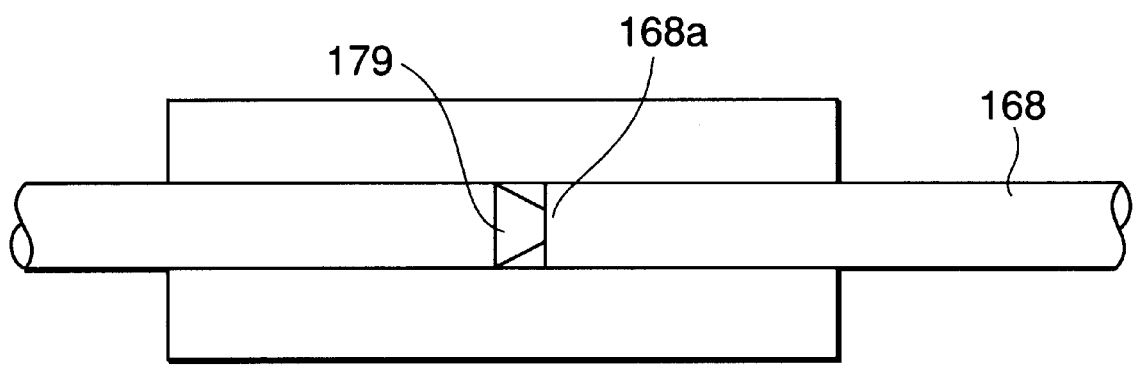
FIG. 7 is a perspective view illustrating a state in which a connecting optical fiber and a transmitting optical fiber used for the optical coupler in accordance with the fourth embodiment are connected.

As illustrated in FIG. 7, the distal end portion 179 of the transmitting optical fiber is tapered in order to prevent chipping or to reduce the contact area to ease surface accuracy. The portion 168a on the other end of the connecting optical fiber 168 is machined to be a plane. The optical coupler 150 is configured so that the distal end portion 179 of the transmitting optical fiber and the portion 168a at the first end of the connecting optical fiber 168 are abutted against each other in the through hole 166 of the sleeve 164 when the plug 170 is coupled to the light emitting module 160.

In the optical coupler 150 in this embodiment, the flange 174a of the holder 174 is urged by a spring 118 toward the light emitting module 160 when the plug 170 is coupled to the light emitting module 160. Further, the holder 174 is pressed by a given force against the first end of the connecting optical fiber 168.

The top open part of the housing 112 is covered by a lid, which is not shown.

In the optical coupler 150 in this embodiment, the transmitting optical fiber is connected to the light emitting module 160 by bringing the plug 170 close to the light emitting module 160 while holding the outer peripheral surface of the holder 174 against the recessed portion 92c of the light emitting module 160 and by engaging the engaging portions 112c with the recessed portions 95. This operation causes the distal end portion 179 of the transmitting optical fiber to be inserted in the through hole 166 from one end of the through hole 166 of the sleeve 164 and to be disposed in the through hole 166. After that, the distal end portion 179 of the transmitting optical fiber is positioned with respect to the first end of the connecting optical fiber 168.

According to the optical coupler 150 having the configuration described above, the connecting optical fiber 168 can be connected to the plug 170 simply by coupling the light emitting module 160 to the plug 170 while inserting the distal end portion of the transmitting optical fiber in the through hole 166 provided in the sleeve 164 of the light emitting module 160. Hence, it becomes possible to connect a transmitting optical fiber of the plug 170 to the connecting optical fiber 168 of the light emitting module 160 without using an expensive part such as a ferrule.

In the optical coupler 150 in this embodiment also, the flange 174a of the holder 174 is urged by the spring 118 toward the light emitting module 160 when the plug 170 is coupled to the light emitting module 160. After that, the holder 174 is pressed by a given force against the other end of the connecting optical fiber 168. Therefore, even if the light emitting module 160 and the plug 170 move relative to each other, the contact between the distal end of the transmitting optical fiber and the other end of the connecting optical fiber 168 will be maintained.

The holders 44, 114, 174 used in the foregoing first, second, and third embodiments provide accuracy of about 1 μm for the inner peripheral portion that holds an optical fiber as in the case of ferrules. Regarding the outside diameter, eccentricity, cylindricity, etc., the accuracy is not required to be as strict as in the case of ferrules. Hence, the prices are not as high as those of ferrules.

The present invention is not limited to the embodiments described above, and various modifications can be made within the scope of the present invention as defined in the appended claims.

In the foregoing first, second, and third embodiments, the second bore portion has been provided with the diverging portion. However, the diverging portion may be omitted.

The foregoing first, second, and third embodiments have been the optical modules equipped with the light emitting devices (semiconductor laser devices) as the optical devices. The present invention is also applicable to an optical module equipped with a light detecting device (semiconductor laser device) as the optical device, a plug for connecting a transmitting optical fiber to an optical module, or an optical coupler provided with the same.

In the present specification, "to position" means to place an object in a state that permits efficient transfer of optical signals. Further, "optical fiber" refers to a "bare fiber" provided with no sheath.

What is claimed is:

1. An optical module comprising:

a substrate;

an optical device mounted on said substrate;

a guide arranged on said substrate and having a rectangular cross-section with opposing inner sides, said guide being adapted to receive a distal end of a transmitting optical fiber; and a connecting optical fiber having a first end and a second end, said connecting optical fiber being arranged in said guide such that said second end is positioned at said optical device and said first end is positioned within said guide so as to oppose the distal end of the transmitting optical fiber to be inserted into and received by said guide, said guide being formed such that a distance between said opposing inner sides is substantially equal to a diameter of said connecting optical fiber.

2. The optical module of claim 1, wherein said substrate has a top surface and a first V-shaped groove formed in said top surface, said connecting optical fiber being arranged in said first V-shaped groove; and the optical module further comprising:

a holding plate having a bottom surface and a second V-shaped groove formed in said bottom surface, said holding plate being mounted on said substrate such that said second V-shaped groove in said bottom surface of said holding plate opposes and is aligned with said first V-shaped groove in said top surface of said substrate so as to form said guide having said rectangular cross-section.

3. The optical module of claim 2, wherein said guide includes a first bore portion and a second bore portion having a first end communicating with said first bore portion, said connecting optical fiber being arranged in said first bore portion, said second bore portion having a second end opening outwardly for receiving a distal end of the transmitting optical fiber to be inserted therein.

4. The optical module of claim 3, wherein said second bore portion has a diverging portion at said second end, wherein said distance between said opposing inner sides of said diverging portion gradually increases toward said second end of said second bore portion so that a size of said guide gradually increases toward said second end of said second bore portion.

5. The optical module of claim 1, wherein said distance between said opposing inner sides is greater than a diameter of the transmitting optical fiber to be inserted in said guide.

6. The optical module of claim 1, wherein said guide includes a first bore portion and a second bore portion having a first end communicating with said first bore portion, said connecting optical fiber being arranged in said first bore portion, said second bore portion having a second end opening outwardly for receiving a distal end of the transmitting optical fiber to be inserted therein.

7. The optical module of claim 6, wherein said second bore portion has a diverging portion at said second end, wherein said distance between said opposing inner sides of said diverging portion gradually increases toward said second end of said second bore portion so that a size of said guide gradually increases toward said second end of said second bore portion.

8. The optical module of claim 6, wherein said distance between said opposing inner sides of said second bore portion is greater than a diameter of the transmitting optical fiber to be inserted in said second bore portion of said guide.

9. The optical module of claim 6, wherein said first bore portion and said second bore portion have an identical cross-sectional shape, and said connecting optical fiber has a larger diameter than the transmitting optical fiber to be inserted in said second bore portion.

10. The optical module of claim 1, further comprising a package accommodating said substrate, said package having an end including a pair of protuberances projecting from said end for connection to a fiber optic plug.

11. The optical module of claim 1, further comprising a photodiode device mounted on said substrate and arranged at a side of said optical device such that said optical device is positioned between said second end of said connecting optical fiber and said photodiode device.

* * * * *